United States Patent
Zhang et al.

(10) Patent No.: US 10,255,476 B2
(45) Date of Patent: Apr. 9, 2019

(54) FINGERPRINT REGISTRATION METHOD AND DEVICE AND TERMINAL THEREOF

(71) Applicant: GUANGDONG OPPO MOBILE TELECOMMUNICATIONS CORP., LTD., Dongguan (CN)

(72) Inventors: Haiping Zhang, Dongguan (CN); Yibao Zhou, Dongguan (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 27 days.

(21) Appl. No.: 15/538,208

(22) PCT Filed: Sep. 18, 2016

(86) PCT No.: PCT/CN2016/099252
§ 371 (c)(1),
(2) Date: Jun. 21, 2017

(87) PCT Pub. No.: WO2017/080308
PCT Pub. Date: May 18, 2017

(65) Prior Publication Data
US 2017/0372121 A1    Dec. 28, 2017

(30) Foreign Application Priority Data
Nov. 13, 2015    (CN) .......................... 2015 1 0786291

(51) Int. Cl.
*G06K 9/00* (2006.01)
*G06K 9/03* (2006.01)

(52) U.S. Cl.
CPC .......... *G06K 9/00067* (2013.01); *G06K 9/00* (2013.01); *G06K 9/00013* (2013.01);
(Continued)

(58) Field of Classification Search
None
See application file for complete search history.

(56) References Cited

U.S. PATENT DOCUMENTS

| | | | | |
|---|---|---|---|---|
| 5,187,747 A | * | 2/1993 | Capello | G06K 9/00067 382/124 |
| 6,134,340 A | * | 10/2000 | Hsu | G06K 9/00087 382/124 |

(Continued)

FOREIGN PATENT DOCUMENTS

| | | |
|---|---|---|
| CN | 1480896 A | 3/2004 |
| CN | 1538425 A | 3/2005 |

(Continued)

OTHER PUBLICATIONS

Alsonso-Fernandez, F., Fierrez, J., Ortega-Garcia, J., Gonzalez-Rodriguez, J., Fronthaler, H., Kollreider, K., Bigun, J. "A Comparative Study of Fingerprint Image-Quality Estimation Methods" IEEE Transactions on Information Forensics and Security vol. 2 No. 4 Dec. 2007.

*Primary Examiner* — Kevin Ky
(74) *Attorney, Agent, or Firm* — Young Basile Hanlon & MacFarlane, P.C.

(57) ABSTRACT

A fingerprint registration method, device and terminal thereof are proposed. The method includes: retrieving feature information of a fingerprint recoded every time based on preset index types when registering the fingerprint; matching the feature information based on preset index information corresponding to the index types to determine whether the fingerprint recorded every time is effective; and signaling a successful fingerprint registration if a number of effective fingerprints recorded is monitored to reach a preset number of fingerprint templates.

23 Claims, 4 Drawing Sheets

(52) U.S. Cl.
CPC ..... *G06K 9/00087* (2013.01); *G06K 9/00926* (2013.01); *G06K 9/036* (2013.01)

(56) References Cited

U.S. PATENT DOCUMENTS

| | | | |
|---|---|---|---|
| 7,536,038 B2 * | 5/2009 | Scholze | G06K 9/00067 382/124 |
| 2002/0181749 A1 * | 12/2002 | Matsumoto | G06K 9/00006 382/125 |
| 2004/0042645 A1 | 3/2004 | Wang | |
| 2005/0152585 A1 * | 7/2005 | Shatford | G06K 9/00026 382/124 |
| 2005/0226467 A1 | 10/2005 | Hatano et al. | |
| 2005/0238214 A1 * | 10/2005 | Matsuda | G06K 9/00006 382/124 |
| 2005/0270140 A1 * | 12/2005 | Oh | G06K 9/00006 340/5.83 |
| 2006/0210170 A1 * | 9/2006 | Yumoto | G06K 9/0008 382/219 |
| 2007/0147670 A1 | 6/2007 | Fujii | |
| 2008/0228770 A1 * | 9/2008 | Halcrow | G06F 17/30079 |
| 2009/0123040 A1 * | 5/2009 | Tatara | G06K 9/00067 382/125 |
| 2015/0036896 A1 * | 2/2015 | Zhou | G06K 9/00067 382/124 |
| 2016/0026840 A1 * | 1/2016 | Li | G06K 9/00013 348/77 |
| 2016/0147987 A1 | 5/2016 | Jang et al. | |
| 2016/0253548 A1 * | 9/2016 | Dos Remedios | G06K 9/00013 382/125 |

FOREIGN PATENT DOCUMENTS

| | | |
|---|---|---|
| CN | 1924889 A | 3/2007 |
| CN | 101030246 A | 9/2007 |
| CN | 101165704 A | 4/2008 |
| CN | 104036267 A | 9/2014 |
| CN | 104615991 A | 5/2015 |
| CN | 105389565 A | 3/2016 |
| WO | 2015009111 A1 | 1/2015 |

* cited by examiner

FINGERPRINT REGISTRATION METHOD AND DEVICE AND TERMINAL THEREOF

CROSS REFERENCE TO RELATED APPLICATION

This application is a US national phase application based upon an International Application No. PCT/CN2016/099252, filed on Sep. 18, 2016, which claims priority to Chinese Application No. 201510786291.6, filed on Nov. 13, 2015. The entire disclosures of the above applications are incorporated herein by reference.

BACKGROUND OF THE INVENTION

1. Field of the Invention

The present disclosure relates to a fingerprint recognition technology, more particularly, to a fingerprint registration method and a device and a terminal thereof.

2. Description of the Related Art

With the development of finger recognition technology, an increasing number of terminals are integrated with the finger recognition function. The processing efficiency and security of corresponding operations are increased through the finger recognition technology, for example, an unlock operation of a mobile terminal, a payment operation of a mobile paying device, a control operation of an access control system and a clock in/out operation of an attendance device, etc.

In order to satisfy the appearance requirement of the terminal equipment having the finger recognition function, the size of finger modules becomes increasingly smaller. However, if the area of a registered fingerprint is overly small, the recognition rate is very low in the subsequent use by the user, resulting in a very high non match rate.

To improve the fingerprint registration quality, a user is required to record his fingerprint multiple times. However, for an inexperienced user, the quality of recorded fingerprint is still not high even though the number of recording is sufficient.

SUMMARY

The present application is intended to resolve one of the technical problems in the related art to at least a certain extent.

A first objective of the present application is to provide a fingerprint registration method. The method improves the fingerprint registration quality and user experience, and increases the fingerprint registration efficiency and the match rate during a use process of the user.

A second objective of the present application is to provide a fingerprint registration device.

A third objective of the present application is to provide a terminal.

A fourth objective of the present application is to provide a terminal.

A fifth objective of the present application is to provide a non-transitory computer-readable storage medium.

In an embodiment of a first aspect, the present application provides a fingerprint registration method to achieve the objectives. The fingerprint registration method includes the following blocks: feature information of a fingerprint recorded every time is retrieved based on preset index types when the fingerprint is registered; the feature information is matched based on preset index information corresponding to the index types to determine whether the fingerprint recorded every time is effective; a successful fingerprint registration is signaled if a number of effective fingerprints recorded is monitored to reach a preset number of fingerprint templates.

In an embodiment of a second aspect, a fingerprint registration device is provided. The fingerprint registration device includes a retrieve module, a matching module and a processing module. The retrieve module is configured to retrieve feature information of a fingerprint recorded every time based on preset index types when the fingerprint is registered. The matching module is configured to match the feature information based on preset index information corresponding to the index types to determine whether the fingerprint recorded every time is effective. The processing module is configured to signal a successful fingerprint registration if it monitors that a number of effective fingerprints recorded reaches a preset number of fingerprint templates.

In an embodiment of a third aspect, a terminal includes a device main body and the fingerprint registration device as provided above.

In an embodiment of a fourth aspect, a terminal is provided. The terminal includes a casing, a processor, a memory, a circuit board, and a power circuit. The circuit board is disposed in a space surrounded by the casing. The processor and the memory are disposed on the circuit board. The power circuit is configured to supply power to various circuits or components of the terminal. The memory is configured to store executable program instructions. The processor runs a program corresponding to the executable program instructions through reading the executable program instructions stored in the memory so as to execute the following blocks.

Feature information of a fingerprint recorded every time is retrieved based on preset index types when the fingerprint is registered. The feature information is matched based on preset index information corresponding to the index types to determine whether the fingerprint recorded every time is effective. A successful fingerprint registration is signaled if a number of effective fingerprints recorded is monitored to reach a preset number of fingerprint templates.

In an embodiment of a fifth aspect, a non-transitory computer-readable storage medium is provided. The non-transitory computer-readable storage medium stores one or more program instructions executable by a device. The device executes the one or more program instructions to perform the fingerprint registration method as provided above.

The present application improves the fingerprint registration quality and user experience, and increases the fingerprint registration efficiency and the match rate during a use process of the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
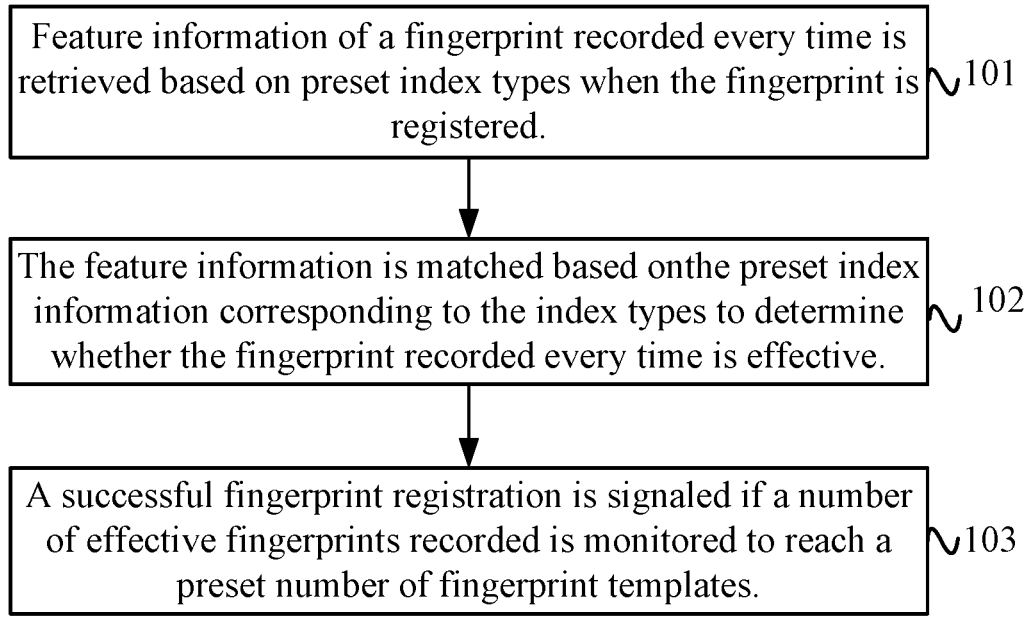
FIG. 1 illustrates a flowchart of a fingerprint registration method according to one embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

A description of a fingerprint registration method and a device and a terminal thereof according to embodiments of the present disclosure is provided as follows with reference to accompanying drawings.

FIG. 1 illustrates a flowchart of a fingerprint registration method according to one embodiment of the present disclosure.

As shown in FIG. 1, the fingerprint registration method can begin at block 101.

At block 101, feature information of a fingerprint recorded every time is retrieved based on preset index types when the fingerprint is registered.

In greater detail, the fingerprint registration method according to the present embodiment disposed in a terminal having a fingerprint recognition function is taken as an example for illustration. It is noted that the types of terminals are many and the terminal may be selected depending on an application, for example, a cell phone, an attendance device, a paying device, or an access control device, etc.

The index types for determining a quality of a fingerprint image recorded when registering and index information corresponding to index types are preset. The more index types there are, the better the discrimination performance for the quality of the fingerprint image is. Since the quality requirement of the fingerprint image in different scenarios varies, the index types may be disposed depending on practical needs. In greater detail, the index types may include at least one of the following: a signal-to-noise ratio, sharpness, an area ratio of a fingerprint zone to a template image, and a number of feature points. It is noted that, in greater detail, the number of feature points in the index types refers to that two different fingerprints do not generate same feature data when fingerprint images are processed to retrieve the feature points. The feature points typically are a bifurcation point of fingerprint lines, an end point, a core point, and a delta point, etc.

The preset index information corresponds to the index types one on one. For example, the preset index types include: the sharpness, the area ratio of the fingerprint zone to the template image, and the number of feature points. Then, the corresponding index information includes: effective information of sharpness, effective information or an area ratio, and effective information of number of feature points.

After a user registers his fingerprint and acquires the fingerprint image recorded every time, the fingerprint image is processed to obtain the feature information correspondingly based on the preset index types. For example, if the preset index types include the sharpness, the area ratio of the fingerprint zone to the template image, and the number of feature points, the fingerprint image recorded every time when registering is processed correspondingly based on the preset index types to obtain sharpness, an area ratio of a fingerprint zone to a template image, and a number of feature points corresponding to the fingerprint image.

At block S102, the feature information is matched based on the preset index information corresponding to the index types to determine whether the fingerprint recorded every time is effective.

In greater detail, the feature information of the recorded fingerprint image is matched based on the preset index information corresponding to the index types to determine whether the fingerprint recorded every time is effective. Since a number of the preset index types differs, the corresponding matching process also varies. A detailed description is provided as follows.

If a number of the preset index type and a number of the corresponding index information are one, a number of the obtained feature information of the fingerprint image is one. If the feature information satisfies the preset index information, the index information is successfully matched with the feature information. That is, the quality of the fingerprint recorded this time satisfies a preset criterion. The recorded fingerprint is thus determined to be effective. If the feature information does not satisfy the preset index information, a match between the index information and the feature information fails. That is, the quality of the fingerprint recorded this time does not satisfy the preset criterion. The recorded fingerprint is thus determined to be ineffective.

If the number of the preset index types and the number of the corresponding index information are plural, the number of the obtained feature information corresponding to the index types is plural. The feature information corresponding to each of the index types is respectively compared with the index information. If a match between the feature information corresponding to all the index types and the index information succeeds, that is, the quality of the fingerprint recorded this time satisfies the preset criterion. The recorded fingerprint is determined to be effective. If a match between the feature information corresponding to at least one index type and the index information is not successful, the quality of the fingerprint recorded this time does not satisfy the preset criterion. The recorded fingerprint is thus determined to be ineffective. Examples are provided as follows.

If the preset index information includes sharpness of higher than or equal to 80%, an area ratio of more than or equal to 70%, and a number of feature points of more than or equal to 20 and when the feature information of the recorded fingerprint image is sharpness of 90%, an area ratio of 80%, and a number of feature points of 30, the index information corresponding to each of the index types is respectively matched with the feature information. It is obtained that the feature information of all the index types matches the index information. The fingerprint recorded this time is thus determined to be effective. When the feature information of the recorded fingerprint image is sharpness of 70%, an area ratio of 80%, and a number of feature points of 15, the index information corresponding to each of the index types is respectively matched with the feature information. It is obtained that the feature information "15" corresponding to the number of feature points in the index types does not match with the index information of "more than or equal to 20". The fingerprint recorded this time is thus determined to be ineffective.

At block 103, a successful fingerprint registration is signaled if a number of effective fingerprints recorded is monitored to reach a preset number of fingerprint templates.

Effectiveness of the fingerprint recorded every time is determined based on the above processes. If a currently recorded fingerprint is determined to be ineffective, the fingerprint recorded this time cannot be used as a fingerprint template. If the currently recorded fingerprint is determined to be effective, the fingerprint recorded this time is used as the fingerprint template.

Owing to the versatility of the application scenarios of fingerprint recognition, the requirement of the recognition performance varies. For the application scenarios of high-precision recognition performance, the more the number of registered fingerprint templates is, the better it is. For the application scenarios of low-precision recognition performance, it is enough once the number of the registered fingerprint templates satisfies a recognition threshold value. Therefore, the number of the registered fingerprint templates is predetermined depending on different application scenarios.

A number of effective fingerprints recorded during the registration process is monitored based on the preset number of the fingerprint templates. If the number of effective fingerprints recorded is monitored to reach the preset number of the fingerprint templates, the successful fingerprint registration is signaled.

According to the fingerprint registration method of the present embodiment, the feature information of the fingerprint recorded every time is first retrieved based on the preset index types when registering the fingerprint. The feature information is matched based on the preset index information corresponding to the index types to determine whether the fingerprint recorded every time is effective. If it is monitored that the number of the effective fingerprints recorded reaches the preset number of the fingerprint templates, the successful fingerprint registration is signaled. Hence, both the fingerprint registration quality and user experience are attended, and the fingerprint registration efficiency and the match rate during use process are increased.

Based on the above embodiment, in order to further improve the registration quality, it is necessary for the user to consciously record as much of the whole fingerprint zone as possible, for example, as much of upper, lower, left and right zones of the fingerprint need to be recorded as possible. Thus, during the registration recording process, the preset number of the fingerprint templates includes a sum of a number of zone templates corresponding to each fingerprint zone, and a movement of the user's fingerprint is guided and navigated. For example, the preset number of the fingerprint templates is 20, and fingerprint zones recorded are classified into five zones, that is, the upper, lower, left and right zones and a center zone. Four templates are therefore recorded for each zone. After recording of one of the zones is completed, the user is reminded to record a next zone. A detailed description of the implementation process is provided with reference to the embodiment shown in FIG. 2.

Figure 2:
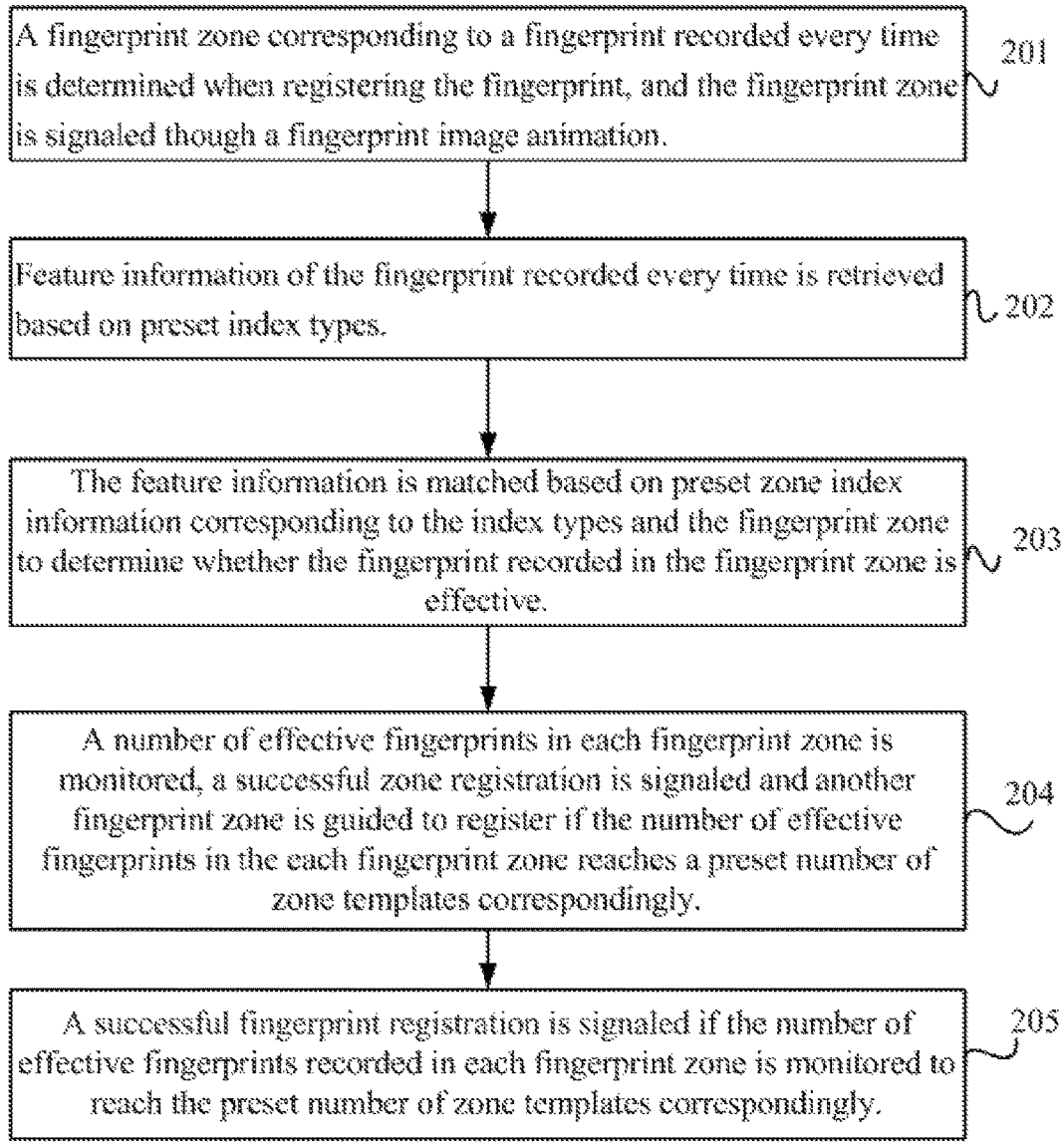
FIG. 2 illustrates a flowchart of a fingerprint registration method according to another embodiment of the present disclosure.

FIG. 2 illustrates a flowchart of a fingerprint registration method according to another embodiment of the present disclosure.

As shown in FIG. 2, a number of fingerprint templates according to the present embodiment includes a sum of a number of zone templates corresponding to each fingerprint zone. The fingerprint registration method can begin at block 201.

At block 201, a fingerprint zone corresponding to a fingerprint recorded every time is determined when registering the fingerprint, and the fingerprint zone is signaled though a fingerprint image animation.

In greater detail, the fingerprint zone corresponding to the fingerprint recorded every time is determined based on a contact point of the fingerprint recorded every time when registering the fingerprint, and the determined fingerprint zone is signaled though the fingerprint image animation by a three-dimensional image of a virtual finger on a display screen. In addition, the fingerprint zone may be signaled by voice.

At block 202, feature information of the fingerprint recorded every time is retrieved based on preset index types.

After a fingerprint image recorded every time is acquired, the fingerprint image is processed based on the preset index types to obtain the feature information correspondingly. For example, if the preset index types include sharpness, an area ratio of a fingerprint zone to a template image, and a number of feature points, the fingerprint image recorded every time when registering is processed correspondingly based on the preset index types to obtain sharpness, an area ratio of a fingerprint zone to a template image, and a number of feature points corresponding to the fingerprint image.

At block 203, the feature information is matched based on preset zone index information corresponding to the index types and the fingerprint zone to determine whether the fingerprint recorded in the fingerprint zone is effective.

In greater detail, zone index information corresponding to the preset index types and the determined fingerprint zone is obtained. Then, the feature information of the fingerprint image recorded in a current fingerprint zone is matched based on the zone index information to determine whether the fingerprint recorded in the fingerprint zone is effective. Since a number of the preset index types differs, the corresponding matching process also varies. A detailed description is provided as follows.

If a number of the preset index type and a number of the corresponding index information are one, a number of the obtained feature information of the fingerprint image is one. If the feature information satisfies the preset index information, the index information is successfully matched with the feature information. That is, a quality of the fingerprint recorded this time satisfies a preset criterion, the fingerprint recorded in the fingerprint zone is determined to be effective. If the feature information does not satisfy the preset index information, a match between the index information and the feature information fails. That is, the quality of the fingerprint recorded this time does not satisfy the preset criterion. The fingerprint recorded in the fingerprint zone is determined to be ineffective.

If the number of the preset index types and the number of the corresponding index information are plural, the number of the obtained feature information corresponding to the index types is plural. The feature information corresponding to each of the index types is respectively compared with the index information. If a match between the feature information corresponding to all the index types and the index information succeeds, that is, the quality of the fingerprint recorded this time satisfies the preset criterion. The fingerprint recorded in the fingerprint zone is determined to be effective. If a match between the feature information corresponding to at least one index type and the index information is not successful, the quality of the fingerprint recorded this time does not satisfy the preset criterion. The fingerprint recorded in the fingerprint zone is thus determined to be ineffective. Examples are provided as follows.

If the preset index information includes sharpness of higher than or equal to 80%, an area ratio of more than or equal to 70%, and a number of feature points of more than or equal to 20 and when the feature information of the recorded fingerprint image is sharpness of 90%, an area ratio of 80%, and a number of feature points of 30, the index information corresponding to each of the index types is respectively matched with the feature information. It is obtained that the feature information of all the index types matches the index information. The fingerprint recorded in the fingerprint zone is thus determined to be effective. When the feature information of the recorded fingerprint image is sharpness of 70%, an area ratio of 80%, and a number of feature points of 15, the index information corresponding to each of the index types is respectively matched with the feature information. It is obtained that the feature information "15" corresponding to the number of feature points in the index types does not match with the index information of "more than or equal to 20". The fingerprint recorded in the fingerprint zone is thus determined to be ineffective.

At block 204, a number of effective fingerprints in each fingerprint zone is monitored, a successful zone registration is signaled and another fingerprint zone is guided to register if the number of effective fingerprints in the each fingerprint zone reaches a preset number of zone templates correspondingly.

In greater detail, a preset number of fingerprint templates according to the present embodiment includes a sum of a number of zone templates corresponding to each fingerprint zone, and a movement of a user's fingerprint is guided and navigated. For example, the preset number of the fingerprint templates is 20, and fingerprint zones recorded are classified into five zones, that is, an upper zone, a lower zone, a left zone, a right zone and a center zone. Four templates are therefore recorded for each zone. After recording of one of the zones is completed, the successful zone registration is signaled and the user is reminded to record a next zone.

At block 205, a successful fingerprint registration is signaled if the number of effective fingerprints recorded in each fingerprint zone is monitored to reach the preset number of zone templates correspondingly.

The number of effective fingerprints recorded in each fingerprint zone during the registration process is monitored based on the corresponding preset number of zone templates. If the number of effective fingerprints recorded in each fingerprint zone is monitored to reach the corresponding preset number of zone templates, the successful fingerprint registration is signaled.

According to the fingerprint registration method of the present embodiment, the fingerprint zone corresponding to the fingerprint recorded every time is first determined when registering the fingerprint, and the fingerprint zone is guided and signaled though the fingerprint image animation. The feature information of the fingerprint recorded every time is retrieved based on the preset index types, then the feature information is matched based on the preset index information corresponding to the index types and the fingerprint zone to determine whether the fingerprint recorded in the fingerprint zone is effective. The number of effective fingerprints in each fingerprint zone is monitored. The successful zone registration is signaled and another fingerprint zone is guided to register if the number of effective fingerprints in the each fingerprint zone reaches the corresponding preset number of zone templates. If it is monitored that the number of effective fingerprints recorded in each fingerprint zone reaches the corresponding preset number of zone templates, the successful fingerprint registration is signaled. Hence, zone navigation and registration are realized to further ensure the fingerprint registration quality, and increase the fingerprint registration efficiency and the fingerprint match rate during use process.

Based on the above embodiment, in order to better control the fingerprint registration quality, the method further includes the following block.

If it is monitored that a number of ineffective fingerprints recorded reaches a preset control number, a failed fingerprint registration is signaled.

In greater detail, owing to some special circumstances, such as a heavy contaminant on the user's finger or failure of a fingerprint registration device, multiple user inputs are ineffective during the fingerprint registration process. A control number is therefore preset. The number of ineffective fingerprints recorded during the registration process is monitored based on the preset control number. If the number of ineffective fingerprints recorded is monitored to reach the preset control number, the failed fingerprint registration is signaled to allow the cause to be checked in a timely manner and registration to be performed again. As a result, the waste of processing resources is avoided to increase the processing efficiency.

Based on the above embodiment, in order to further control the fingerprint registration quality and guide the user to register the fingerprint effectively in a timely manner. The method further includes the following block.

If it is monitored that a number of all recorded fingerprints reaches a preset total number, ending of fingerprint registration is signaled.

In greater detail, owing to some special circumstances, such as in-process failure of a fingerprint registration device, previous inputs are effective but the subsequent inputs are ineffective during the fingerprint registration process by the user. A total number is therefore preset. The number of all recorded fingerprints (include effective fingerprints and ineffective fingerprints) during the registration process is monitored based on the preset total number. If it is monitored that the number of all recorded fingerprints reaches the preset total number, ending of fingerprint registration is signaled to allow the cause to be checked in a timely manner and registration to be performed again. Or, in the subsequent use process, the established fingerprint template is continuously improved through a learning algorithm to further ensure the registration quality and increase the processing efficiency.

Based on the above embodiment, in order to further improve user experience and guide the user to more effectively register the fingerprint, the method further includes the following block after determining whether the fingerprint recorded every time is effective.

Whether the fingerprint recorded every time is effective or not is signaled to the user. The signaling methods may be many, such as ringing, vibration, or a voice method signaling the user whether or not the fingerprint recorded every time is effective. The signaling method may be selected depending on a practical application, and the present embodiment is not limited in this regard. Examples are provided as follows.

A ringing method is used to signal the user that a currently recorded fingerprint is effective.

Or, a vibration method is used to signal the user that the currently recorded fingerprint is ineffective.

Or, voice is used to signal the user whether the currently recorded fingerprint is effective or ineffective.

Based on the above embodiment, in order to further improve user experience and guide the user to more effectively register the fingerprint, the method further includes the following block after determining whether the fingerprint recorded every time is effective.

A progress bar is used to show the user a registration progress corresponding to the fingerprint having been effectively recorded every time.

In greater detail, each effective recording will move a corresponding progress bar (a full size is 100%/). For example, after the 5th effective recording is completed, the progress bar is moved from 20% that represents the 4th effective recording to 28%. Each increasing magnitude of the progress bar may be uniform depending on the number of fingerprint templates disposed. For example, the number of fingerprint templates is 10, and each effective fingerprint recording moves the progress bar by a factor of 10%. Or, the increase may be non-uniform depending on a number of feature points of the effectively recorded fingerprint image. That is, under the circumstances of effective recording, the more the feature points of the fingerprint is, the more increase of the progress bar there is.

In another embodiment, for example, if the number of fingerprint templates has not satisfied the preset number of the fingerprint templates that is 20 but a total number has reached 25, such as a number of ineffective recording being 7 and a number of effective templates being 18, it is obvious that that a gap exists between 18 templates and 20 templates and the progress bar has not reached 100%, based on the design of the progress bar. However, in order to attend user experience, the progress bar is forced to 100% even though the 25th recording has not satisfied the requirement of 20 fingerprint templates.

In order to realize the above embodiment, a fingerprint registration device is further provided according to the present application.

Figure 3:
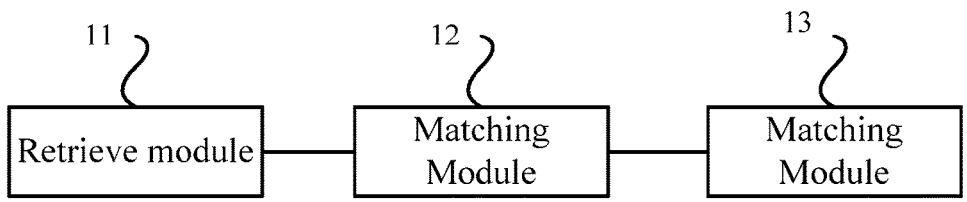
FIG. 3 illustrates a schematic diagram of a structure of a fingerprint registration device according to one embodiment of the present disclosure.

FIG. 3 illustrates a schematic diagram of a structure of a fingerprint registration device according to one embodiment of the present disclosure.

The fingerprint registration device includes a retrieve module 11, a matching module 12, and a processing module 13.

The retrieve module 11 is configured to retrieve feature information of a fingerprint recorded every time based on preset index types when the fingerprint is registered.

The index types include at least one of the following: a signal-to-noise ratio, sharpness, an area ratio of a fingerprint zone to a template image, and a number of feature points.

The matching module 12 is configured to match the feature information based on preset index information corresponding to the index types to determine whether the fingerprint recorded every time is effective.

The processing module 13 is configured to signal a successful fingerprint registration if it is monitored that a number of effective fingerprints recorded reaches a preset number of fingerprint templates.

It is noted that the above illustration and description of the embodiment of the fingerprint registration method are also applied to the fingerprint registration device according to the present embodiment, and a description in this regard is not provided.

According to the fingerprint registration device of the present embodiment, the feature information of the fingerprint recorded every time is first retrieved based on the preset index types when registering the fingerprint. The feature information is matched based on the preset index information corresponding to the index types to determine whether the fingerprint recorded every time is effective. If it is monitored that the number of the effective fingerprints recorded reaches the preset number of the fingerprint templates, the successful fingerprint registration is signaled. Hence, both the fingerprint registration quality and user experience are attended, and the fingerprint registration efficiency and the match rate during use process are increased.

Based on the above embodiment, in order to further improve the registration quality, it is necessary for the user to consciously record as much of the whole fingerprint zone as possible, for example, as much of upper, lower, left and right zones of the fingerprint need to be recorded as possible. Thus, during the registration recording process, the preset number of the fingerprint templates includes a sum of a number of zone templates corresponding to each fingerprint zone, and a movement of the user's fingerprint is guided and navigated. For example, the preset number of the fingerprint templates is 20, and fingerprint zones recorded are classified into five zones, that is, the upper, lower, left and right zones and a center zone. Four templates are therefore recorded for each zone. After recording of one of the zones is completed, the user is reminded to record a next zone. A detailed description of the implementation process is provided with reference to the embodiment shown in FIG. 2.

Figure 4:
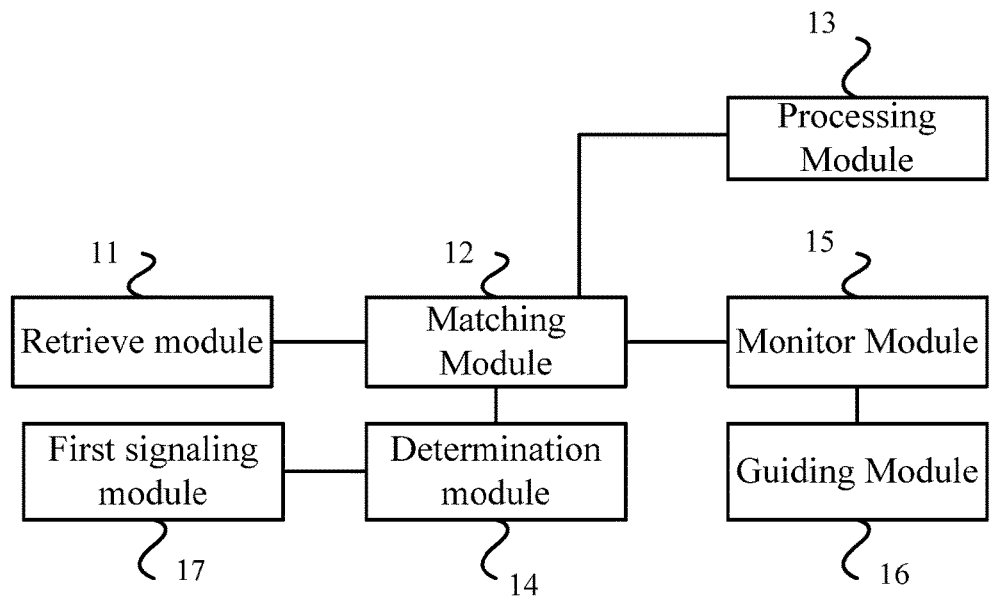
FIG. 4 illustrates a schematic diagram of a structure of a fingerprint registration device according to another embodiment of the present disclosure.

FIG. 4 illustrates a schematic diagram of a structure of a fingerprint registration device according to another embodiment of the present disclosure.

As shown in FIG. 4, a number of fingerprint templates according to the present embodiment includes a sum of a number of zone templates corresponding to each fingerprint zone that is set. Based on the embodiment shown in FIG. 3, the fingerprint registration device further includes a determination module 14.

The determination module 14 is configured to determine a fingerprint zone corresponding to a fingerprint recorded every time.

The matching module 12 is configured to match the feature information based on preset index information corresponding to the index types and the fingerprint zone to determine whether the fingerprint recorded in the fingerprint zone is effective.

The processing module 13 is configured to signal a successful fingerprint registration if it is monitored that a number of effective fingerprints recorded in each fingerprint zone reaches a preset number of zone templates correspondingly.

In addition, the fingerprint registration device further includes a monitor module 15, a guiding module 16, and a first signaling module 17.

The monitor module 15 is configured to monitor a number of effective fingerprints in each fingerprint zone.

The guiding module 16 is configured to signal a successful zone registration and guide another fingerprint zone to register if the number of effective fingerprints in the each fingerprint zone reaches the preset number of zone templates correspondingly.

The first signaling module 17 is configured to guide and signal the fingerprint zone though a fingerprint image animation.

It is noted that the above illustration and description of the embodiment of the fingerprint registration method are also applied to the fingerprint registration device according to the present embodiment, and a description in this regard is not provided.

According to the fingerprint registration device of the present embodiment, the fingerprint zone corresponding to the fingerprint recorded every time is first determined when registering the fingerprint, and the fingerprint zone is guided and signaled though the fingerprint image animation. The feature information of the fingerprint recorded every time is retrieved based on the preset index types, then the feature information is matched based on the preset index information corresponding to the index types and the fingerprint zone to determine whether the fingerprint recorded in the fingerprint zone is effective. The number of effective fingerprints in each fingerprint zone is monitored. The successful zone registration is signaled and another fingerprint zone is guided to register if the number of effective fingerprints in the each fingerprint zone reaches the corresponding preset number of zone templates. If it is monitored that the number of effective fingerprints recorded in each fingerprint zone reaches the corresponding preset number of zone templates, the successful fingerprint registration is signaled. Hence, zone navigation and registration are realized to further ensure the fingerprint registration quality, and increase the fingerprint registration efficiency and the fingerprint match rate during use process.

Figure 5:
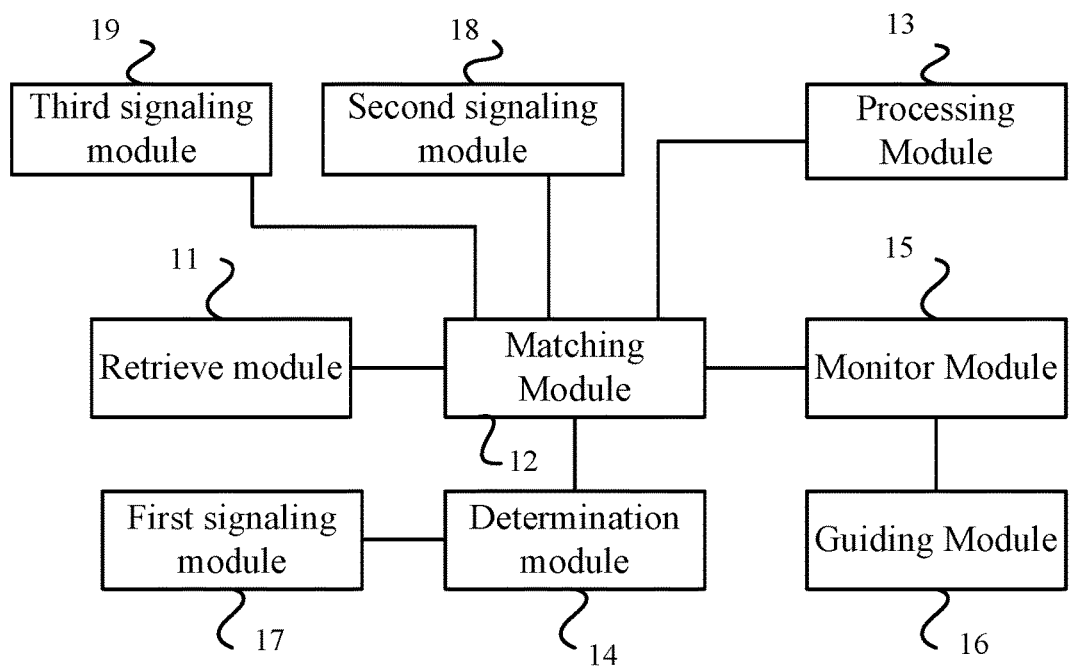
FIG. 5 illustrates a schematic diagram of a structure of a fingerprint registration device according to still another embodiment of the present disclosure.

FIG. 5 illustrates a schematic diagram of a structure of a fingerprint registration device according to still another embodiment of the present disclosure.

As shown in FIG. 5, based on the above embodiment and FIG. 4 that is taken as an example, the fingerprint registration device further includes a second signaling module 18 to further improve user experience and guide the user to more effectively register the fingerprint.

The second signaling module 18 is configured to signal whether or not the fingerprint recorded every time is effective.

The second signaling module 18 is configured to signal whether or not the fingerprint recorded every time is effective through ringing, vibration, or voice.

In addition, in order to better control the fingerprint registration quality, the processing module 13 is further configured to perform the following actions.

A failed fingerprint registration is signaled if it is monitored that a number of ineffective fingerprints recorded reaches a preset control number.

In addition, in order to further control the fingerprint registration quality and guide the user to register the fingerprint effectively in a timely manner, the processing module 13 is further configured to perform the following actions.

Ending of fingerprint registration is signaled if it is monitored that a number of all recorded fingerprints reaches a preset total number.

In addition, in order to further improve user experience and guide the user to more effectively register the fingerprint, the finger registration device further includes a third signaling module 19.

The third signaling module 19 is configured to show a user a registration progress of a fingerprint having been effectively recorded every time through a progress bar.

The third signaling module 19 is configured to uniformly show the user the registration progress of the fingerprint having been effectively recorded every time through the progress bar based on the number of fingerprint templates.

Or, the third signaling module 19 is configured to non-uniformly show the user the registration progress of the fingerprint having been effectively recorded every time through the progress bar based on feature points of the fingerprint having been effectively recorded every time.

The above illustration and description of the embodiment of the fingerprint registration method are also applied to the fingerprint registration device according to the present embodiment, and a description in this regard is not provided.

In order to realize the above embodiments, the present application further provides a terminal.

The terminal includes a terminal body and the fingerprint registration device according to any of the above embodiments of the present disclosure.

The types of the terminals are many and may include, for example, a cell phone, an attendance device, a paying device, or an access control device.

The above illustration and description of the embodiments of the fingerprint registration methods are also applied to the terminal according to the present embodiment, and their implementation principles are similar. A description in this regard is not provided.

According to the terminal of the present embodiment, the feature information of the fingerprint recorded every time is first retrieved based on the preset index types when the fingerprint registration device registers the fingerprint. The feature information is matched based on the preset index information corresponding to the index types to determine whether the fingerprint recorded every time is effective. If it is monitored that the number of the effective fingerprints recorded reaches the preset number of the fingerprint templates, the successful fingerprint registration is signaled. Hence, both the fingerprint registration quality and user experience are improved, and the fingerprint registration efficiency and the match rate during use process are increased.

In order to realize the above embodiments, the present application further provides a terminal.

Figure 6:
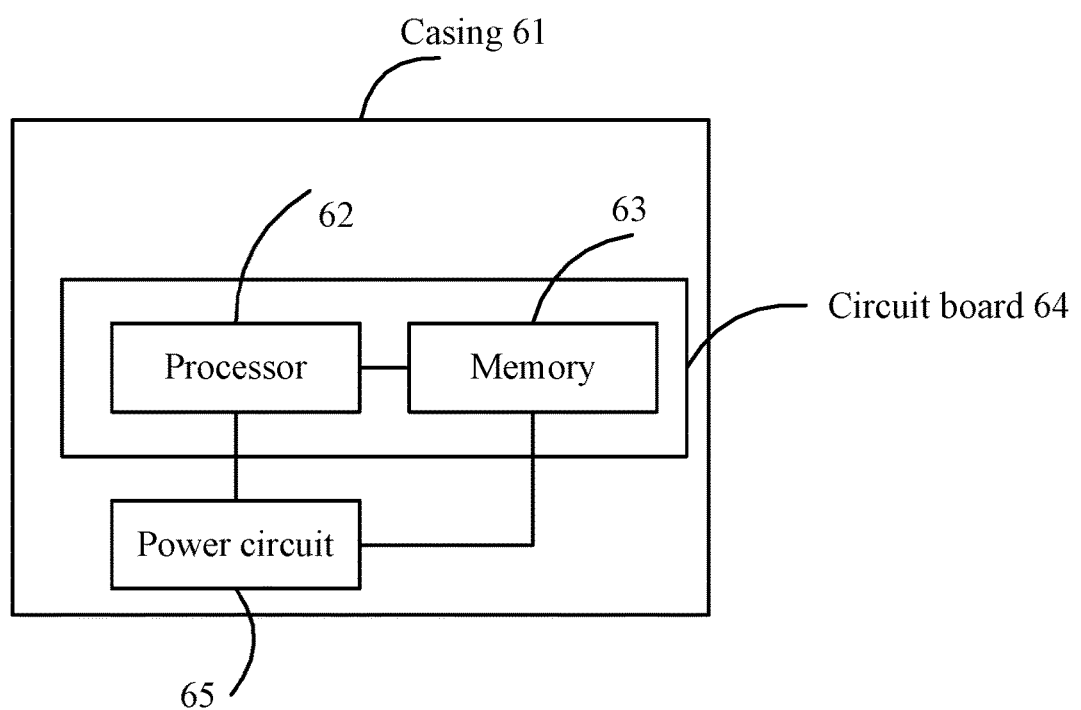
FIG. 6 illustrates a schematic diagram of a structure of a terminal according to one embodiment of the present disclosure.

Refer to FIG. 6, FIG. 6 illustrates a schematic diagram of a structure of a terminal according to one embodiment of the present disclosure.

The terminal according to the present embodiment includes a casing 61, a processor 62, a memory 63, a circuit board 64 and a power circuit 65. The circuit board 64 is disposed in a space surrounded by the casing 61. The processor 62 and the memory 63 are disposed on the circuit board 64. The power circuit 65 is configured to supply power to various circuits or components of the mobile terminal. The memory 63 is configured to store executable program instructions. The processor 62 runs a program corresponding to the executable program instructions through reading the executable program instructions stored in the memory 63 so as to execute the following operations.

Feature information of a fingerprint recorded every time is retrieved based on preset index types when the fingerprint is registered.

The feature information is matched based on preset index information corresponding to the index types to determine whether the fingerprint recorded every time is effective.

A successful fingerprint registration is signaled if it is monitored that a number of effective fingerprints recorded reaches a preset number of fingerprint templates.

It is noted that the above illustration and description of the embodiments of the fingerprint registration methods are also applied to the terminal according to the present embodiment, and their implementation principles are similar. A description in this regard is not provided.

According to the terminal of the present embodiment, the processor runs the program corresponding to the executable program instructions through reading the executable program instructions stored in the memory so as to execute the following operations. The feature information of the fingerprint recorded every time is retrieved based on the preset index types when the fingerprint is registered. The feature information is matched based on the preset index information corresponding to the index types to determine whether the fingerprint recorded every time is effective. If it is monitored that the number of the effective fingerprints recorded reaches the preset number of the fingerprint templates, the successful fingerprint registration is signaled. Hence, both the fingerprint registration quality and user experience are improved, and the fingerprint registration efficiency and the match rate during use process are increased.

In order to realize the above embodiments, the present application further provides a non-transitory computer-readable storage medium storing a plurality of program instructions executable by a device. The device executes the plurality of program instructions to perform the fingerprint registration method as provided in the embodiments with reference to FIG. 1.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Any process or method described in the flowchart or otherwise described herein may be understood to include one or more modules, fragments, or portions of code of an executable instruction to implement a particular logical function or process. In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

The logic and/or blocks described in the flowchart or otherwise described herein, for example, a sequence list of an executable instruction for implementing a logic function, may be implemented in any computer-readable medium for use by an instruction execution system, device or equipment (such as a computer-based system, a system including a processor, or other system that can access instructions from an instruction execution system, device or equipment and execute instructions), or may be used in conjunction with the instruction execution system, device or equipment. As used herein, "computer-readable medium" may be any device that may include a store, communication, broadcast, or transmission program for use by an instruction execution system, device or equipment, or in conjunction with such instruction execution systems, device, or equipment. A more specific example (non-exhaustive list) of the computer-readable medium includes the following: an electrical connection portion (an electronic device) with one or more routing, a portable computer disk cartridge (a magnetic device), a random access memory (RAM), a read only memory (ROM), an erasable programmable read only memory (EPROM or a flash memory), a fiber optic device, and a portable compact disc read only memory (CDROM). In addition, the computer-readable medium may even be a paper or other suitable medium on which the program may be printed. For example, through performing an optical scan on the paper or other media, followed by editing, interpretation, or, if necessary, other suitable methods to process, the program is obtained in an electronic manner, and then the program is stored in a computer memory.

It should be understood that the various parts of the present disclosure may be implemented by using hardware, software, firmware, or combinations thereof. In the above embodiment, the plurality of blocks or methods may be implemented by using software or firmware stored in the memory and executed by a suitable instruction execution system. For example, if the present disclosure is implemented by hardware, as in another embodiment, it may be implemented by any of the following techniques known in the art or a combination thereof: a discrete logic circuit of logic gates having a logic function for a data signal, an application specific integrated circuit with suitable combinational logic gates, a programmable gate array (PGA), a field programmable gate array (FPGA), and the like.

It will be understood by those of ordinary skill in the art that all or part of the blocks for implementing the method of the embodiments described above may be accomplished by a program that commands the relevant hardware. The program may be stored in a computer readable storage medium. When the program is executed, one of the blocks of the method embodiment or a combination thereof may be included.

In addition, the functional units in the various embodiments of the present disclosure may be integrated into a processing module, or each unit may be physically present individually, or two or more units may be integrated into one module. The above integrated module may be implemented by using hardware, or may be implemented by using a software function module. The integrated module may be stored in a computer readable storage medium if it is implemented by a software function module and is sold or used as a standalone product.

The above-mentioned storage medium may be a read-only memory, a magnetic disk, or an optical disk. While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:

1. A fingerprint registration method comprising:
   determining, by a terminal device, a fingerprint zone corresponding to a fingerprint recorded every time when registering the fingerprint;
   retrieving, by the terminal device, feature information of the fingerprint recorded every time based on preset index types that are configured for determining a quality of the fingerprint recorded;
   matching, by the terminal device, the feature information based on preset index information corresponding to the index types to determine whether the fingerprint recorded every time is effective, wherein the preset index information corresponds to the index types one to one; and
   signaling, by the terminal device, a successful fingerprint registration if a number of effective fingerprints recorded is monitored to reach a preset number of fingerprint templates, wherein the preset number of fingerprint templates comprises a sum of a number of zone templates corresponding to each fingerprint zone,
   wherein signaling, by the terminal device, the successful fingerprint registration if the number of effective fingerprints recorded is monitored to reach the preset number of fingerprint templates comprises:
   signaling, by the terminal device, the successful fingerprint registration if a number of effective fingerprints recorded in each fingerprint zone is monitored to reach a preset number of zone templates correspondingly.

2. The method as claimed in claim 1, wherein the index types comprise at least one of a signal-to-noise ratio, sharpness, an area ratio of a fingerprint zone to a template image, or a number of feature points.

3. The method as claimed in claim 2, wherein matching, by the terminal device, the feature information based on the preset index information corresponding to the index types to determine whether the fingerprint recorded every time is effective comprises:
   matching, by the terminal device, the feature information based on preset zone index information corresponding to the index types and the fingerprint zone to determine whether the fingerprint recorded in the fingerprint zone is effective.

4. The method as claimed in claim 3, further comprising:
   monitoring, by the terminal device, the number of effective fingerprints in the each fingerprint zone; and
   signaling, by the terminal device, a successful zone registration and guiding another fingerprint zone to register if the number of effective fingerprints in the each fingerprint zone reaches the corresponding preset number of zone templates.

5. The method as claimed in claim 3, wherein after determining, by the terminal device, the fingerprint zone corresponding to the fingerprint recorded every time, the method further comprises:
   guiding and signaling, by the terminal device, the fingerprint zone though a fingerprint image animation.

6. The method as claimed in claim 1, wherein after determining whether the fingerprint recorded every time is effective, the method further comprises:
   signaling, by the terminal device, whether the fingerprint recorded every time is effective or not.

7. The method as claimed in claim 6, wherein signaling whether the fingerprint recorded every time is effective or not comprises:
   signaling, by the terminal device, whether the fingerprint recorded every time is effective or not through ringing, vibration, or voice.

8. The method as claimed in claim 1, further comprising:
   signaling, by the terminal device, a failed fingerprint registration if it is monitored that a number of ineffective fingerprints recorded reaches a preset control number.

9. The method as claimed in claim 1, further comprising:
   signaling, by the terminal device, ending of fingerprint registration if it is monitored that a number of all recorded fingerprints reaches a preset total number.

10. The method as claimed in claim 1, further comprising:
    showing, by the terminal device, a user a registration progress of a fingerprint having been effectively recorded every time through a progress bar.

11. The method as claimed in claim 10, wherein showing, by the terminal device, the user the registration progress of the fingerprint having been effectively recorded every time through the progress bar comprises:
    uniformly showing, by the terminal device, the user the registration progress of the fingerprint having been effectively recorded every time through the progress bar based on the number of fingerprint templates; or
    non-uniformly showing, by the terminal device, the user the registration progress of the fingerprint having been effectively recorded every time through the progress bar based on feature points of the fingerprint having been effectively recorded every time.

12. A fingerprint registration device comprising:
    a processor; and
    a memory connected with the processor, the memory comprising a plurality of program instructions executable by the processor, the plurality of program instructions comprising:
    a determination module, configured to cause the processor to determine a fingerprint zone corresponding to a fingerprint recorded every time when the fingerprint is registered;
    a retrieve module, configured to cause the processor to retrieve feature information of the fingerprint recorded every time based on preset index types that are configured for determining a quality of the fingerprint recorded;
    a matching module, configured to cause the processor to match the feature information based on preset index information corresponding to the index types to determine whether the fingerprint recorded every time is effective, wherein the preset index information corresponds to the index types one to one; and
    a processing module, configured to cause the processor to signal a successful fingerprint registration if it is monitored that a number of effective fingerprints recorded reaches a preset number of fingerprint templates and to cause the processor to signal the successful fingerprint registration if it is monitored that a number of effective fingerprints recorded in each fingerprint zone reaches a preset number of zone templates correspondingly, wherein the preset number of fingerprint templates comprises a sum of a number of zone templates corresponding to each fingerprint zone.

13. The fingerprint registration device as claimed in claim 12, wherein the index types comprise at least one of a signal-to-noise ratio, sharpness, an area ratio of a fingerprint zone to a template image, or a number of feature points.

14. The fingerprint registration device as claimed in claim 13, wherein the matching module is further configured to cause the processor to match the feature information based on preset index information corresponding to the index types and the fingerprint zone to determine whether the fingerprint recorded in the fingerprint zone is effective.

15. The fingerprint registration device as claimed in claim 14, further comprising:
a monitor module, configured to cause the processor to monitor a number of effective fingerprints in each fingerprint zone;
a guiding module, configured to cause the processor to signal a successful zone registration and guide another fingerprint zone to register if the number of effective fingerprints in the each fingerprint zone reaches the preset number of zone templates correspondingly.

16. The fingerprint registration device as claimed in claim 14, further comprising:
a first signaling module, configured to cause the processor to guide and signal the fingerprint zone though a fingerprint image animation.

17. The fingerprint registration device as claimed in claim 12, further comprising:
a second signaling module, configured to cause the processor to signal whether or not the fingerprint recorded every time is effective.

18. The fingerprint registration device as claimed in claim 17, wherein the second signaling module is configured to cause the processor to signal whether or not the fingerprint recorded every time is effective through ringing, vibration, or voice.

19. The fingerprint registration device as claimed in claim 12, wherein the processing module is further configured to cause the processor to signal a failed fingerprint registration if it is monitored that a number of ineffective fingerprints recorded reaches a preset control number.

20. The fingerprint registration device as claimed in claim 12, wherein the processing module is further configured to cause the processor to signal an end of fingerprint registration if it is monitored that a number of all recorded fingerprints reaches a preset total number.

21. The fingerprint registration device as claimed in claim 12, further comprising:
a third signaling module, configured to cause the processor to show a user a registration progress of a fingerprint having been effectively recorded every time through a progress bar.

22. The fingerprint registration device as claimed in claim 21, wherein the third signaling module is configured to cause the processor to uniformly show the user the registration progress of the fingerprint having been effectively recorded every time through the progress bar based on the number of fingerprint templates; or
the third signaling module is configured to cause the processor to non-uniformly show the user the registration progress of the fingerprint having been effectively recorded every time through the progress bar based on feature points of the fingerprint having been effectively recorded every time.

23. A terminal device comprising a casing, a processor, a memory, a circuit board, and a power circuit, wherein the circuit board is disposed in a space surrounded by the casing; the processor and the memory are disposed on the circuit board; the power circuit is configured to supply power to various circuits or components of the terminal device; the memory is configured to store executable program instructions; the processor runs a program corresponding to the executable program instructions through reading the executable program instructions stored in the memory to perform following operations:
determining a fingerprint zone corresponding to a fingerprint recorded every time when registering the fingerprint;
retrieving feature information of the fingerprint recoded recorded every time based on preset index types that are configured for determining a quality of the fingerprint recorded;
matching the feature information based on preset index information corresponding to the index types to determine whether the fingerprint recorded every time is effective, wherein the preset index information corresponds to the index types one to one; and
signaling a successful fingerprint registration if a number of effective fingerprints recorded is monitored to reach a preset number of fingerprint templates, wherein the preset number of fingerprint templates comprises a sum of a number of zone templates corresponding to each fingerprint zone,
wherein signaling the successful fingerprint registration if the number of effective fingerprints recorded is monitored to reach the preset number of fingerprint templates comprises:
signaling the successful fingerprint registration if a number of effective fingerprints recorded in each fingerprint zone is monitored to reach a preset number of zone templates correspondingly.

* * * * *